United States Patent
Yu et al.

(10) Patent No.: US 11,810,492 B2
(45) Date of Patent: Nov. 7, 2023

(54) METHOD FOR DETERMINING AMBIENT LIGHT LUMINANCE, HOST, AND COMPUTER READABLE STORAGE MEDIUM

(71) Applicant: HTC Corporation, Taoyuan (TW)

(72) Inventors: Chia-Wei Yu, Taoyuan (TW);
Ping-Chang Hsieh, Taoyuan (TW);
Chin-Yu Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 22 days.

(21) Appl. No.: 17/736,102

(22) Filed: May 4, 2022

(65) Prior Publication Data

US 2023/0186810 A1 Jun. 15, 2023

Related U.S. Application Data

(60) Provisional application No. 63/289,635, filed on Dec. 15, 2021.

(51) Int. Cl.
*G09G 3/20* (2006.01)
*H04N 23/71* (2023.01)
*H04N 23/72* (2023.01)

(52) U.S. Cl.
CPC .............. *G09G 3/20* (2013.01); *H04N 23/71* (2023.01); *H04N 23/72* (2023.01); *G09G 2320/0626* (2013.01); *G09G 2354/00* (2013.01); *G09G 2360/144* (2013.01)

(58) Field of Classification Search
CPC ............. G09G 3/20; G09G 2320/0626; G09G 2354/00; G09G 2360/144; H04N 23/72; H04N 23/71
See application file for complete search history.

(56) References Cited

U.S. PATENT DOCUMENTS

| 2020/0149956 A1* | 5/2020 | Wang | H04N 23/611 |
| 2020/0154041 A1* | 5/2020 | Chang | H04N 23/45 |

\* cited by examiner

*Primary Examiner* — Sejoon Ahn
(74) *Attorney, Agent, or Firm* — JCIPRNET

(57) ABSTRACT

The embodiments of the disclosure provide a method for determining an ambient light luminance, a host, and a computer readable storage medium. The method includes: obtaining a first frame and a second frame, wherein the first frame comprises a plurality of first regions of interest (ROI), the second frame comprises a plurality of second ROIs, and the first ROIs respectively correspond to the second ROIs; in response to determining that the first ROIs comprise at least one specific ROI satisfying a predetermined condition and at least one first candidate ROI, obtaining at least one second candidate ROI among the second ROIs, wherein the at least one second candidate ROI respectively corresponds to the at least one specific ROI; and determining the ambient light luminance based on the at least one first candidate ROI and the at least one second candidate ROI.

20 Claims, 10 Drawing Sheets

METHOD FOR DETERMINING AMBIENT LIGHT LUMINANCE, HOST, AND COMPUTER READABLE STORAGE MEDIUM

CROSS-REFERENCE TO RELATED APPLICATION

This application claims the priority benefit of U.S. provisional application Ser. No. 63/289,635, filed on Dec. 15, 2021. The entirety of the above-mentioned patent application is hereby incorporated by reference herein and made a part of this specification.

BACKGROUND

1. Field of the Invention

The disclosure generally relates to an environment detection mechanism, in particular, to a method for determining an ambient light luminance, a host, and a computer readable storage medium.

2. Description of Related Art

Generally, head-mounted displays use additional light detectors, such as ambient light sensor or cameras, to detect the ambient light brightness, and accordingly control the shutter transmittance on the head-mounted display device and the brightness of the display. However, disposing additional light detectors will lead to less spatial efficiency and higher cost.

SUMMARY OF THE INVENTION

Accordingly, the disclosure is directed to a method for determining an ambient light luminance, a host, and a computer readable storage medium, which may be used to solve the above technical problems.

The embodiments of the disclosure provide a method for determining an ambient light luminance, adapted to a host, including: obtaining a first frame and a second frame, wherein the first frame includes a plurality of first regions of interest (ROI), the second frame includes a plurality of second ROIs, and the first ROIs respectively correspond to the second ROIs; in response to determining that the first ROIs include at least one specific ROI satisfying a predetermined condition and at least one first candidate ROI, obtaining at least one second candidate ROI among the second ROIs, wherein the at least one second candidate ROI respectively correspond to the at least one specific ROI; and determining the ambient light luminance based on the at least one first candidate ROI and the at least one second candidate ROI.

The embodiments of the disclosure provide a host including a storage circuit and a processor. The storage circuit stores a program code. The processor is coupled to the storage circuit and accessing the program code to perform: obtaining a first frame and a second frame, wherein the first frame includes a plurality of first regions of interest (ROI), the second frame includes a plurality of second ROIs, and the first ROIs respectively correspond to the second ROIs; in response to determining that the first ROIs include at least one specific ROI satisfying a predetermined condition and at least one first candidate ROI, obtaining at least one second candidate ROI among the second ROIs, wherein the at least one second candidate ROI respectively correspond to the at least one specific ROI; and determining the ambient light luminance based on the at least one first candidate ROI and the at least one second candidate ROI.

The embodiments of the disclosure provide a non-transitory computer readable storage medium, the computer readable storage medium recording an executable computer program, the executable computer program being loaded by a host to perform steps of: obtaining a first frame and a second frame, wherein the first frame includes a plurality of first regions of interest (ROI), the second frame includes a plurality of second ROIs, and the first ROIs respectively correspond to the second ROIs; in response to determining that the first ROIs include at least one specific ROI satisfying a predetermined condition and at least one first candidate ROI, obtaining at least one second candidate ROI among the second ROIs, wherein the at least one second candidate ROI respectively correspond to the at least one specific ROI; and determining the ambient light luminance based on the at least one first candidate ROI and the at least one second candidate ROI.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
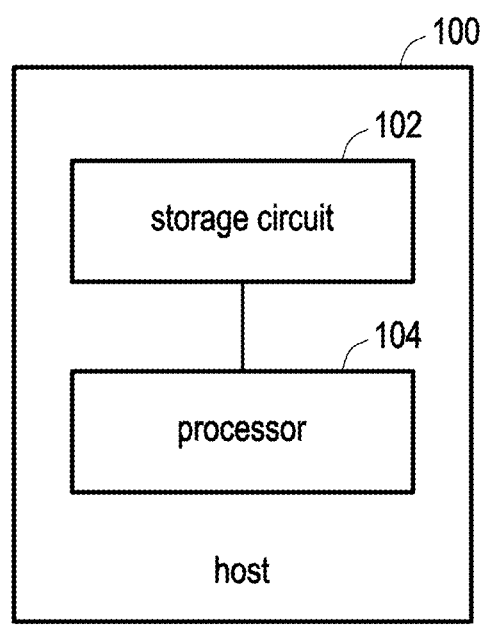
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be implemented as any smart devices and/or computer devices.

The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In one embodiment, the host 100 can be implemented as a tracking device that is capable of performing, for example, inside-out tracking and/or outside-in tracking. In one embodiment, the tracking device can be a wearable device such as a head-mounted display (HMD). In some embodiments, the HMD can be used to provide reality services (e.g., an augmented reality (AR) service, a virtual reality service, and/or the like) by displaying the corresponding visual contents to the wearer, but the disclosure is not limited thereto.

In one embodiment, the host 100 can be disposed with one or more tracking camera for capturing images based on a frame rate (e.g., 60 frames per second (FPS)), wherein the images can be used to perform tracking functions, such as the inside-out tracking.

In one embodiment, the images captured by the tracking camera include a plurality of bright frames and a plurality of dark frames. In one embodiment, the bright frames and the dark frames are interleaved with each other. That is, the previous image and the next image of a bright frame are both dark frames, and the previous image and the next image of a dark frame are both bright frames.

In some embodiments, some of the bright frames can be consecutively captured. For example, the tracking camera can be configured to consecutive capture several bright frames after capturing one dark frame. In some embodiments, some of the dark frames can be consecutively captured. For example, the tracking camera can be configured to consecutive capture several dark frames after capturing one bright frame. In some embodiments, the tracking camera can be configured to consecutive capture several dark frames after consecutively capturing several bright frames. In one embodiment, the tracking camera can be configured to consecutive capture several bright frames after consecutively capturing several dark frames, but the disclosure is not limited thereto.

In one embodiment, when the tracking camera is configured to capture one or more bright frame, the corresponding image-capturing parameters (such as the exposure time, and/or the gain, which collectively form a first image-capturing parameter set) used by the tracking camera will be automatically determined to be proper values, such that the luma (i.e., the average of grayscale values in a certain region) of some specific ROIs in the display of the host 100 (e.g., the HMD) can be within a particular range. In this case, the bright frame used for performing tracking (e.g., the inside-out tracking) will be less possible to have the over-exposure issue.

In one embodiment, when the tracking camera is configured to capture one or more dark frame, the corresponding image-capturing parameters (such as the exposure time, and/or the gain, which collectively form a second image-capturing parameter set) used by the tracking camera are fixed for obtaining proper feature images for performing tracking.

In one embodiment, the first image-capturing parameter set used for capturing the bright frames can exemplarily include a first exposure time and a first gain, and the second image-capturing parameter set used for capturing the dark frames can exemplarily include a second exposure time and a second gain. In one embodiment, the first image-capturing parameter set and the second image-capturing parameter set are exemplarily shown in the following Table 1.

TABLE 1

| Bright Frame Detection | first exposure time | Automatically-determined | Exp(min)~Exp(max) |
| --- | --- | --- | --- |
| | first gain | Automatically-determined | Gain(min)~Gain(max) |
| Dark Frame Detection | second exposure time | Fixed | Exp(min) A few μs |
| | second gain | Fixed | Gain(min) |

In the example of Table 1, the first exposure time of the tracking camera used for capturing the bright frames ranges between a minimum exposure time (referred to as Exp(min)) and a maximum exposure time (referred to as Exp(max)). In one embodiment, Exp(min) can be several microseconds, and Exp(max) can be several milliseconds, but the disclosure is not limited thereto. The first gain of the tracking camera used for capturing the bright frames ranges between a minimum gain (referred to as Gain(min)) and a maximum gain (referred to as Gain(max)). In one embodiment, Gain (min) can be 1× (i.e., maintained as a predetermined gain), and Gain(max) can be several multiples of the predetermined gain (e.g., 16 times of the predetermined gain (referred to as 16×)), but the disclosure is not limited thereto. In addition, in the example of Table 1, the second exposure time and the second gain of the tracking camera used for capturing the dark frames is fixed to be Exp(min) and Gain(min), respectively.

In the embodiments of the disclosure, the ambient light luminance can be determined while maintaining the settings of the tracking camera, such as maintaining the frame rate, the amount of dark/bright frames and the image-capturing parameters. In this case, no light detector for ambient light luminance detection has to be installed on the host 100, and hence the spatial efficiency and cost of the host 100 can be improved.

From another perspective, the disclosure can use the information originally used for tracking to estimate the ambient light luminance, such that the host 100 can determine the ambient light luminance without the light detectors. Detailed discussion would be provided in the following.

In the embodiments of the disclosure, the processor 104 may access the modules stored in the storage circuit 102 to implement the method for determining the ambient light luminance provided in the disclosure, which would be further discussed in the following.

Figure 2:
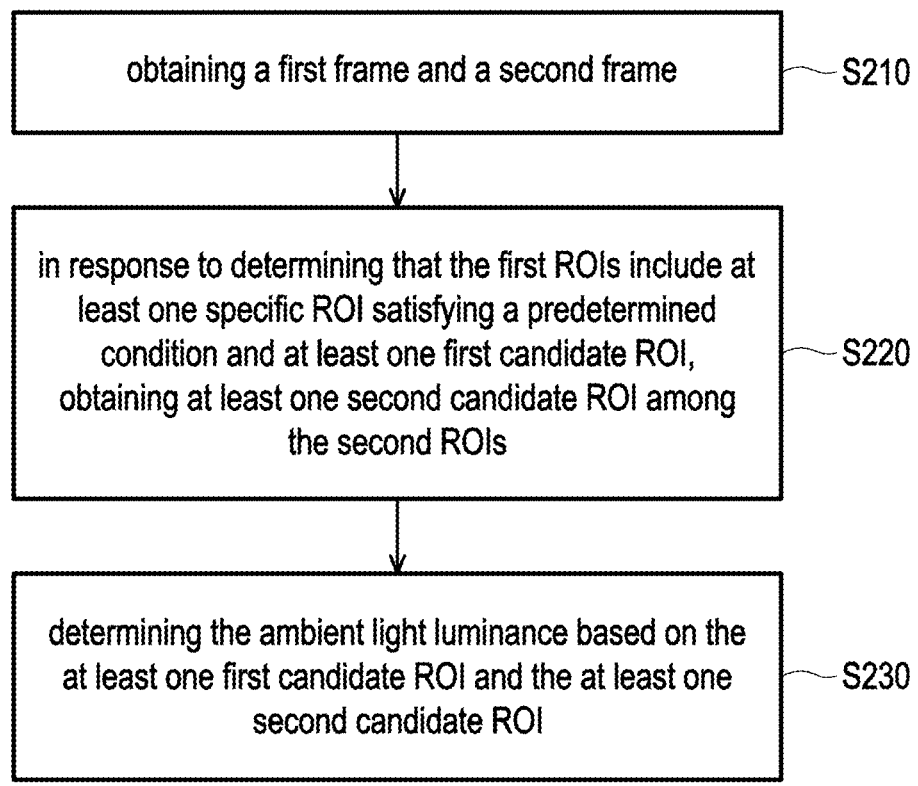
FIG. 2 shows a flow chart of the method for determining the ambient light luminance according to an embodiment of the disclosure.

See FIG. 2, which shows a flow chart of the method for determining the ambient light luminance according to an embodiment of the disclosure. The method of this embodiment may be executed by the host 100 in FIG. 1, and the details of each step in FIG. 2 will be described below with the components shown in FIG. 1.

In step S210, the processor 104 obtains a first frame (referred to as F1) and a second frame (referred to as F2). In one embodiment, the processor 104 obtains a plurality of first specific frames and a plurality of second specific frames. In some embodiments, the processor 104 can control a camera (e.g., the tracking camera) of the host 100 to capture the first specific frames and the second specific frames, but the disclosure is not limited thereto.

In one embodiment, the first specific frames are the bright frames captured by the tracking camera based on the first image-capturing parameter set, and the second specific frames are the dark frames captured by the tracking camera based on the second image-capturing parameter set. In one embodiment, the processor 104 retrieves one of the first specific frames as the first frame F1 and retrieves one of the second specific frames as the second frame F2.

In the embodiment where the first specific frames are the bright frames and the second specific frames are the dark frames, the processor 104 can retrieve one of the bright frames as the first frame F1 and retrieve one of the dark frames as the second frame F2. For better explaining the following concept, the first specific frames will be assumed to be the bright frames, and the second specific frames will be assumed to be the dark frames, but the disclosure is not limited thereto. In one embodiment, the first specific frames are interleaved with the second specific frames (i.e., the bright frames are interleaved with the dark frames).

In one embodiment, the first specific frames and the second specific frames are captured based on the frame rate of the camera. For example, if the frame rate is 60 FPS, the camera will capture one image per 16.66 millisecond, and this image can be one of the first specific frames or the second specific frames.

In one embodiment, a time difference between the first frame F1 and the second frame F2 can be less than a predetermined time threshold. That is, as long as the captured timings of one bright frame and one dark frame are close enough, the processor 104 can determine this bright frame and this dark frame as the first frame F1 and the second frame F2, respectively.

In one embodiment, the time difference between the first frame F1 and the second frame F2 is equal to a reciprocal of the frame rate. In this case, the first frame F1 can be the previous image or the next image of the second frame F2.

In one embodiment, the processor 104 determines the first frame F1 to include plurality of first ROIs. In various embodiments, the first ROIs can be designed to include one or more pixels of the first frame F1. In the embodiment where each first ROI includes one pixel, if the size of the first frame F1 is W×H (W is the width of the first frame F1 and H is the height of the first frame F1), the processor 104 can determine that there are W×H first ROIs in the first frame F1. In the embodiment where each first ROI includes multiple pixels, the pixels in each first ROI and the position of each first ROI in the first frame F1 can be determined based on the requirements of the designer. In one embodiment, the first ROIs are not overlapped with each other.

In one embodiment, the processor 104 determines the second frame F2 to include a plurality of second ROIs, wherein the first ROIs respectively correspond to the second ROIs. For example, in the embodiment where each first ROI includes one pixel and the first frame F1 includes W×H first ROIs, each second ROI also includes one pixel of the second frame F2, and the second frame F2 is determined to include W×H second ROIs.

From another perspective, the first ROIs in the first frame F1 are one-to-one corresponding to the second ROIs in the second frame F2. In particular, for one of the first ROIs having a part of the pixels in the first frame F1, there would be one of the second ROIs having the corresponding part of the pixels in the second frame F2.

In one embodiment, after determining the first ROIs in the first frame F1 and the second ROIs in the second frame F2, the processor 104 determines whether the first ROIs include at least one specific ROI satisfying a predetermined condition and at least one first candidate ROI. Before performing this determination, a term named "camera intensity" proposed by the disclosure should be introduced.

Specifically, in conventional ways for comparing the luminance difference between two image regions (e.g., the first/second ROIs), the values of luma of the image regions would be used as a reference. By definition, the luma of one image region is the average of grayscale values of the pixels in this image region. In the cases where the to-be-compared image regions are captured based on the same image-capturing parameter set and have no overexposure issues, the luma would be a proper reference for luminance comparison.

However, for the image regions (e.g., the first/second ROIs) captured based on different image-capturing parameter set (e.g., the first/second ROIs), the luma would be inapplicable for luminance comparison. In this case, it would be more proper to perform luminance comparison based on the camera intensity of each image region.

In one embodiment, the camera intensity of one image region can be obtained based on the luma thereof and the corresponding image-capturing parameter set. In the example where the image-capturing parameter set of an image region includes the exposure time and the gain, the camera intensity of this image region can be characterized by dividing the luma of this image region with a multiplication of the corresponding exposure time and the corresponding gain.

In one embodiment, if the considered image region only includes one pixel, the luma thereof will be the grayscale value of the pixel therein, and hence the camera intensity may be characterized by dividing the grayscale value of the pixel with a multiplication of the corresponding exposure time (ms) and the corresponding gain, but the disclosure is not limited thereto.

For better explaining the concept of the camera intensity, the following Table 2 would be used as an example.

TABLE 2

| Scenario | Ambient light (Lux) | Exposure Time (ms) | Gain | Luma | Camera Intensity |
|---|---|---|---|---|---|
| 1 | 5047 | 0.064 | 1.5 | 73 | 760.4 |
| 2 | 2553 | 0.128 | 1.5 | 73 | 380.2 |

In Scenario 1 of Table 2, a first image region is captured based on the corresponding image-capturing parameters, and the luma and the camera intensity of the first image region are shown in Table 2. In Scenario 2 of Table 2, a second image region (which captures the same environment as the first image region) is captured based on the corresponding image-capturing parameters, and the luma and the camera intensity of the second image region are shown in Table 2.

As can be seen from Table 2, although the ambient light luminance of Scenario 1 is almost twice the ambient light luminance of Scenario 2, the lumas of the first image region and the second image region are the same, which represents that the luma is not proper for performing luminance comparison when the first image region and the second image region are captured based on different image-capturing parameters.

However, the camera intensity of the first image region is twice the camera intensity of the second image region, which properly characterizes the difference between the light intensities of the first image region and the second image region. That is, the camera intensity would be more proper for luminance comparison when the first image region and the second image region are captured based on different image-capturing parameters.

In one embodiment, the correspondence relationship between different camera intensities and the corresponding ambient light luminance can be measured through experiments in advance.

Figure 3A:
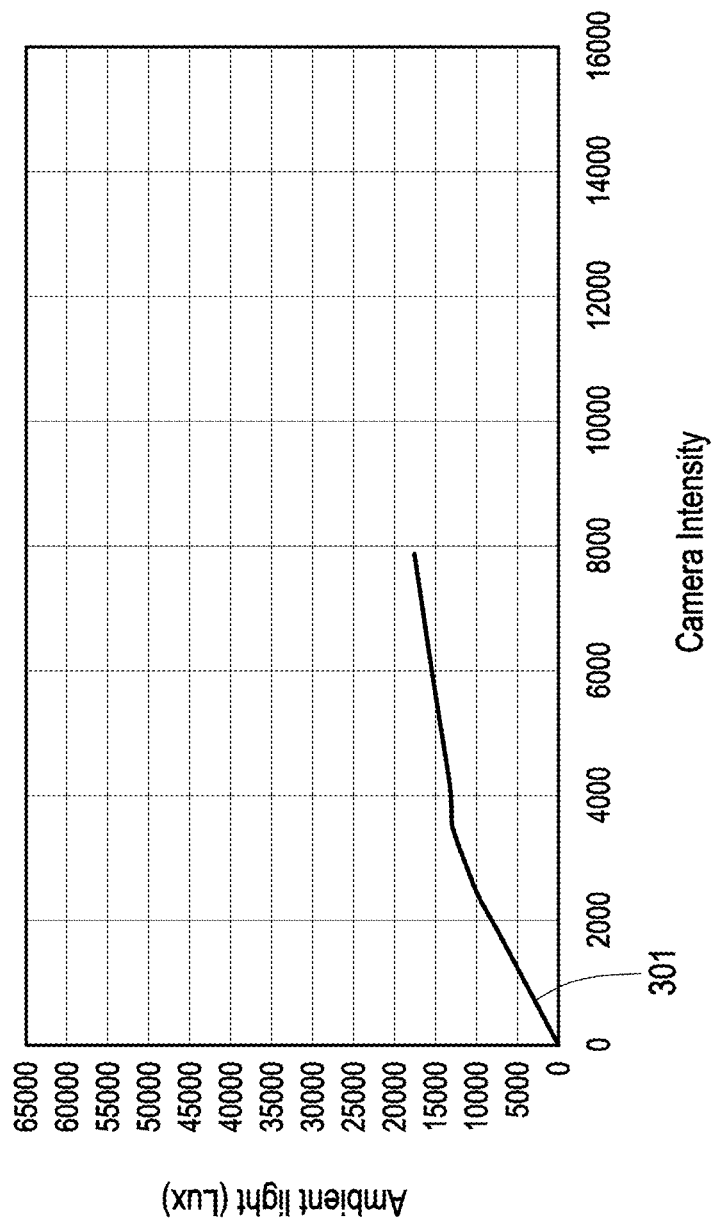
FIG. 3A shows the correspondence relationship between different camera intensities and the ambient light luminance according to an embodiment of the disclosure.

See FIG. 3A, which shows the correspondence relationship between different camera intensities and the ambient light luminance according to an embodiment of the disclosure. In FIG. 3A, under different ambient light luminance, the camera intensity of the ROIs in the bright frames are shown as a curve 301.

As can be seen in FIG. 3A, the correspondence relationship between the camera intensity and the ambient light luminance is linear when the ambient light luminance is relatively low (e.g., lower than 10000 lux), and the resolution is high as well.

However, the correspondence relationship between the camera intensity and the ambient light luminance becomes non-linear when the ambient light luminance is relatively high (e.g., higher than 10000 lux). In particular, the reason why the correspondence relationship becomes non-linear when the ambient light luminance is high is because that when the bright frames are captured, the corresponding image-capturing parameters are automatically determined for obtaining the feature points required for inside-out tracking in the bright frames. In this case, if some objects with high light intensities (e.g., light sources such as fluorescent light and/or searchlight) are captured in the bright frames, the related image regions in the bright frames will be overexposed, such that the actual luminance will be unavailable.

Therefore, it would be more accurate to use the camera intensity in FIG. 3A to estimate the corresponding ambient light luminance when the ambient light luminance is relatively low (e.g., lower than 10000 lux). From another perspective, it would be inaccurate to use the camera intensity in FIG. 3A to estimate the corresponding ambient light luminance when the ambient light luminance is relatively high (e.g., higher than 10000 lux).

Figure 3B:
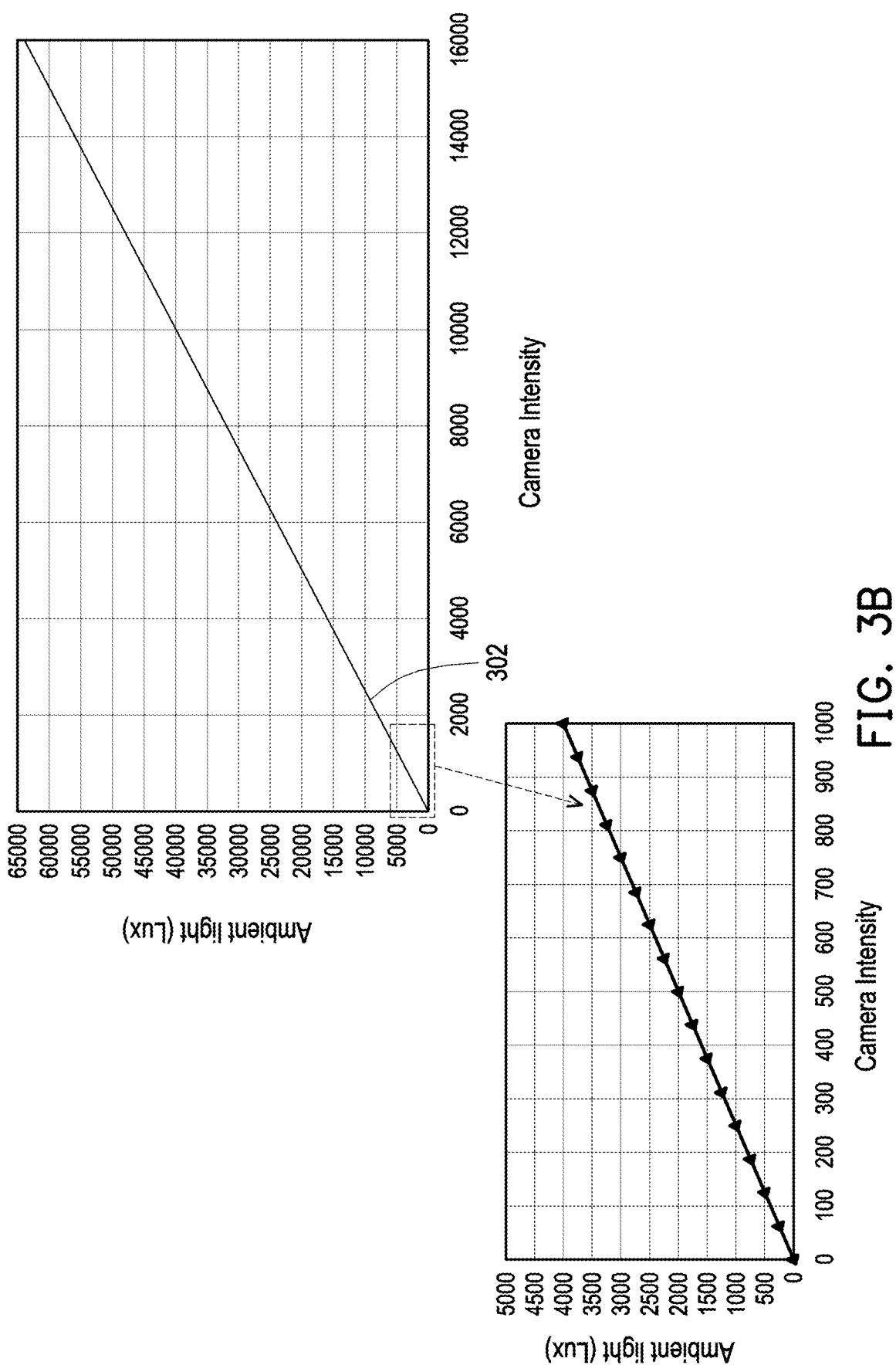
FIG. 3B shows the correspondence relationship between different camera intensities and the ambient light luminance according to an embodiment of the disclosure.

See FIG. 3B, which shows the correspondence relationship between different camera intensities and the ambient light luminance according to an embodiment of the disclosure. In FIG. 3B, under different ambient light luminance, the camera intensity of the ROIs in the dark frames are shown as a curve 302.

As can be seen in FIG. 3B, the correspondence relationship between the camera intensity and the ambient light luminance is linear for almost all ambient light luminance, but the resolution is relatively low when the ambient light luminance is low (e.g., lower than 10000 lux).

Specifically, as can be seen from the enlarged view (shown on the bottom left of FIG. 3B) of the part of camera intensities corresponding to the lower ambient light luminance range (e.g., lower than 5000 lux), the difference between two adjacent data points (shown as triangles in FIB. 3B) is large, which represents that the resolution is relatively low when the ambient light luminance is low.

Therefore, it would be more accurate to use the camera intensity in FIG. 3B to estimate the corresponding ambient light luminance when the ambient light luminance is relatively high (e.g., higher than 10000 lux). Based on the observations related to FIG. 3A and FIG. 3B, FIG. 3C can be obtained.

Figure 3C:
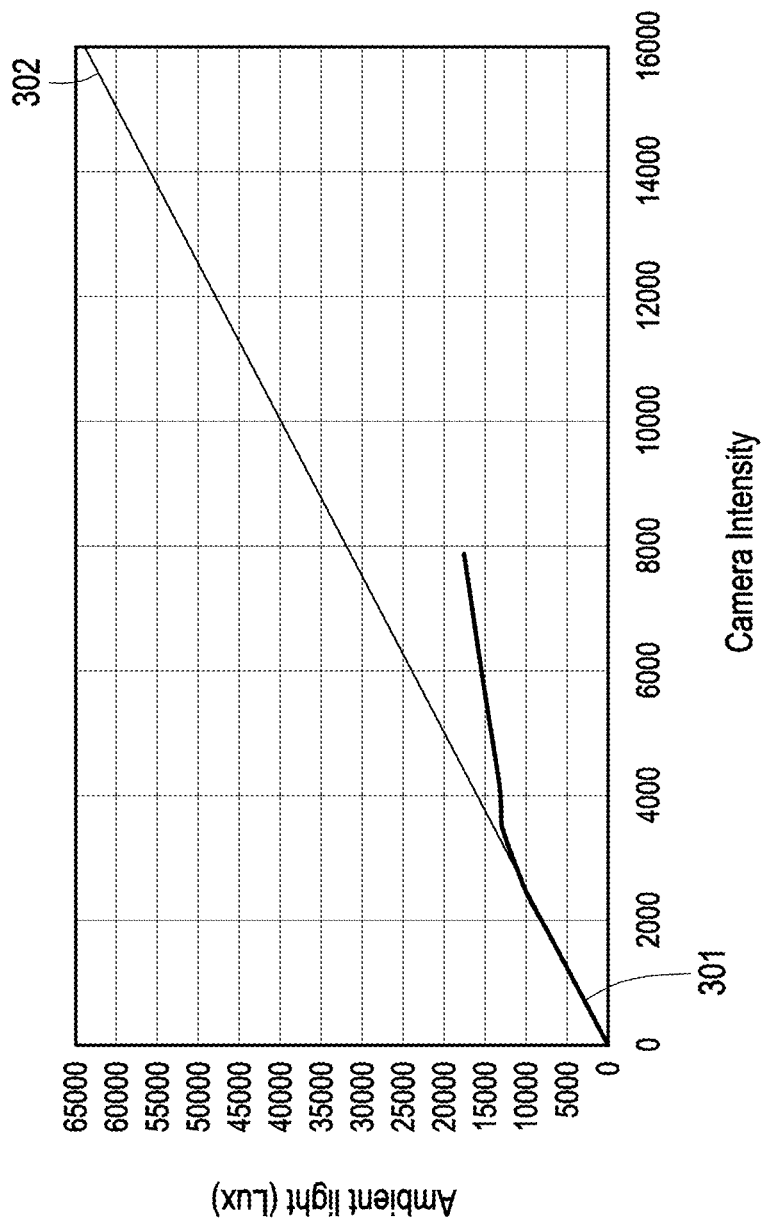
FIG. 3C shows the correspondence relationship between different camera intensities and the ambient light luminance according to FIG. 3A and FIG. 3B.

See FIG. 3C, which shows the correspondence relationship between different camera intensities and the ambient light luminance according to FIG. 3A and FIG. 3B. Based on FIG. 3C, it could be determined that when the ambient light luminance estimated based on the camera intensity of (the ROI of) one bright frame is higher than a luminance threshold (e.g., 10000 lux), the estimated ambient light luminance will be inaccurate due to the non-linearity of the curve 301. In this case, the ambient light luminance estimated based on the camera intensity of (the ROI of) the dark frame corresponding to the considered bright frame would be more accurate.

In one embodiment, based on the observation in FIG. 3C, the processor 104 can determine whether the first ROIs include at least one specific ROI satisfying the predetermined condition and at least one first candidate ROI.

Figure 4:
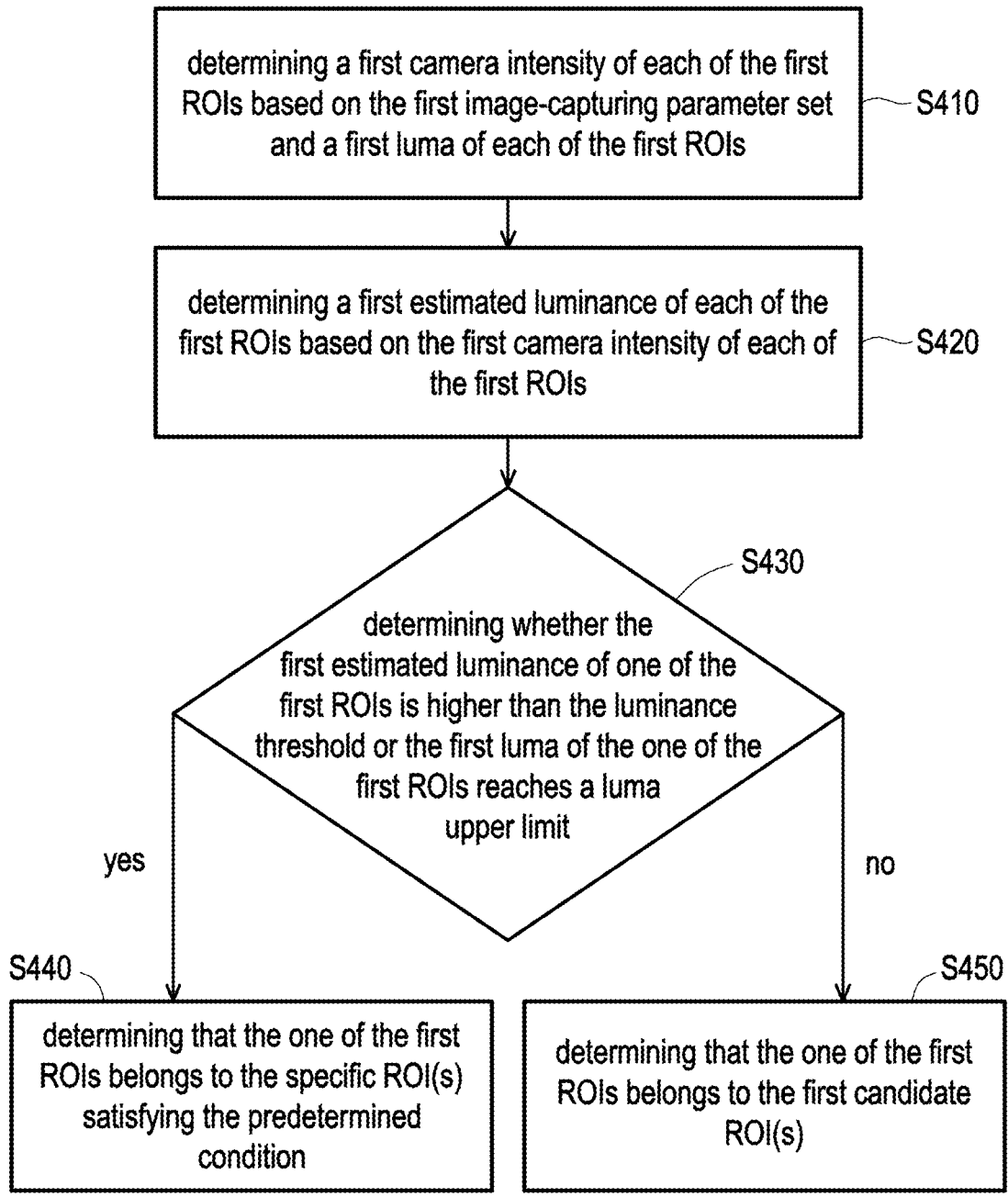
FIG. 4 shows a flow chart of the mechanism for determining the specific ROI and the first candidate ROI according to an embodiment of the disclosure.

See FIG. 4, which shows a flow chart of the mechanism for determining the specific ROI and the first candidate ROI according to an embodiment of the disclosure.

In step S410, the processor 104 determines a first camera intensity of each of the first ROIs based on the first image-capturing parameter set and a first luma of each of the first ROIs. In one embodiment, the processor 104 can determine the first camera intensity of the respective first ROI by dividing the first luma of the respective first ROI with a multiplication of the first exposure time and the first gain. For example, if the first luma of one first ROI is L1 (i.e., the average of grayscale values in this first ROI), the first exposure time is Exp1 and the first gain G1, the first camera intensity of this first ROI can be characterized by L1/(Exp1·G1), but the disclosure is not limited thereto.

In step S420, the processor 104 can determine a first estimated luminance of each of the first ROIs based on the first camera intensity of each of the first ROIs. In one embodiment, the processor 104 can determine the first estimated luminance of the respective first ROI by searching for a result corresponding to the first camera intensity of the respective first ROI in a first look-up table as the first estimated luminance of the respective first ROI.

In one embodiment, the first look-up table can be established in advance based on the curve 301 in FIG. 3A. In this case, once the first camera intensity of one first ROI is obtained, the processor 104 can use the corresponding ambient light luminance in FIG. 3A as the corresponding first estimated luminance. For example, if the first camera intensity of one first ROI is 2000, the corresponding first estimated luminance would be about 6000 according to FIG. 3A. For another example, if the first camera intensity of one first ROI is 6000, the corresponding first estimated luminance would be about 15000 according to FIG. 3A.

In step S430, the processor 104 determines whether the first estimated luminance of one of the first ROIs is higher than the luminance threshold (e.g., 10000 lux) or the first luma of the one of the first ROIs reaches a luma upper limit (e.g., 255). If yes, the processor 104 can perform step S440 to determine that the one of the first ROIs belongs to the specific ROI(s) satisfying the predetermined condition. In detail, if the first estimated luminance of the considered first ROI is higher than the luminance threshold, it represents that the accuracy of the first estimated luminance is low. In addition, if the first luma of the considered first ROI reaches the luma upper limit, it represents that the considered first ROI has an over exposure issue, which means that the considered first ROI is not suitable for estimating the corresponding ambient light luminance. That is, the processor 104 can determine a part of the first ROIs whose first estimated luminance is higher than the luminance threshold as the specific ROI(s) satisfying the predetermined condition.

On the other hand, in response to determining that the first estimated luminance of one of the first ROIs is not higher than the luminance threshold and the first luma of the one of the first ROIs does not reach the luma upper limit, the processor 104 can perform step S450 to determine that the one of the first ROIs belongs to the first candidate ROI(s). That is, the processor 104 can determine another part of the first ROIs whose first estimated luminance is not higher than the luminance threshold as the first candidate ROI(s), but the disclosure is not limited thereto.

Referring back to FIG. 2, in step S220, in response to determining that the first ROIs include at least one specific ROI satisfying the predetermined condition and at least one first candidate ROI, the processor 104 obtains at least one second candidate ROI among the second ROIs, wherein the at least one second candidate ROI respectively correspond to the at least one specific ROI. In one embodiment, after obtaining the specific ROI(s) among the first ROIs, the processor 104 determines the second candidate ROI(s) based on the specific ROI(s). Since first ROIs in the first frame F1 are one-to-one corresponding to the second ROIs in the second frame F2, the processor 104 can determine the part of the second ROIs corresponding to the specific ROI(s) in the first ROIs as the second candidate ROI(s), but the disclosure is not limited thereto.

Next, in step S230, the processor 104 determines the ambient light luminance based on the at least one first candidate ROI and the at least one second candidate ROI.

Figure 5:
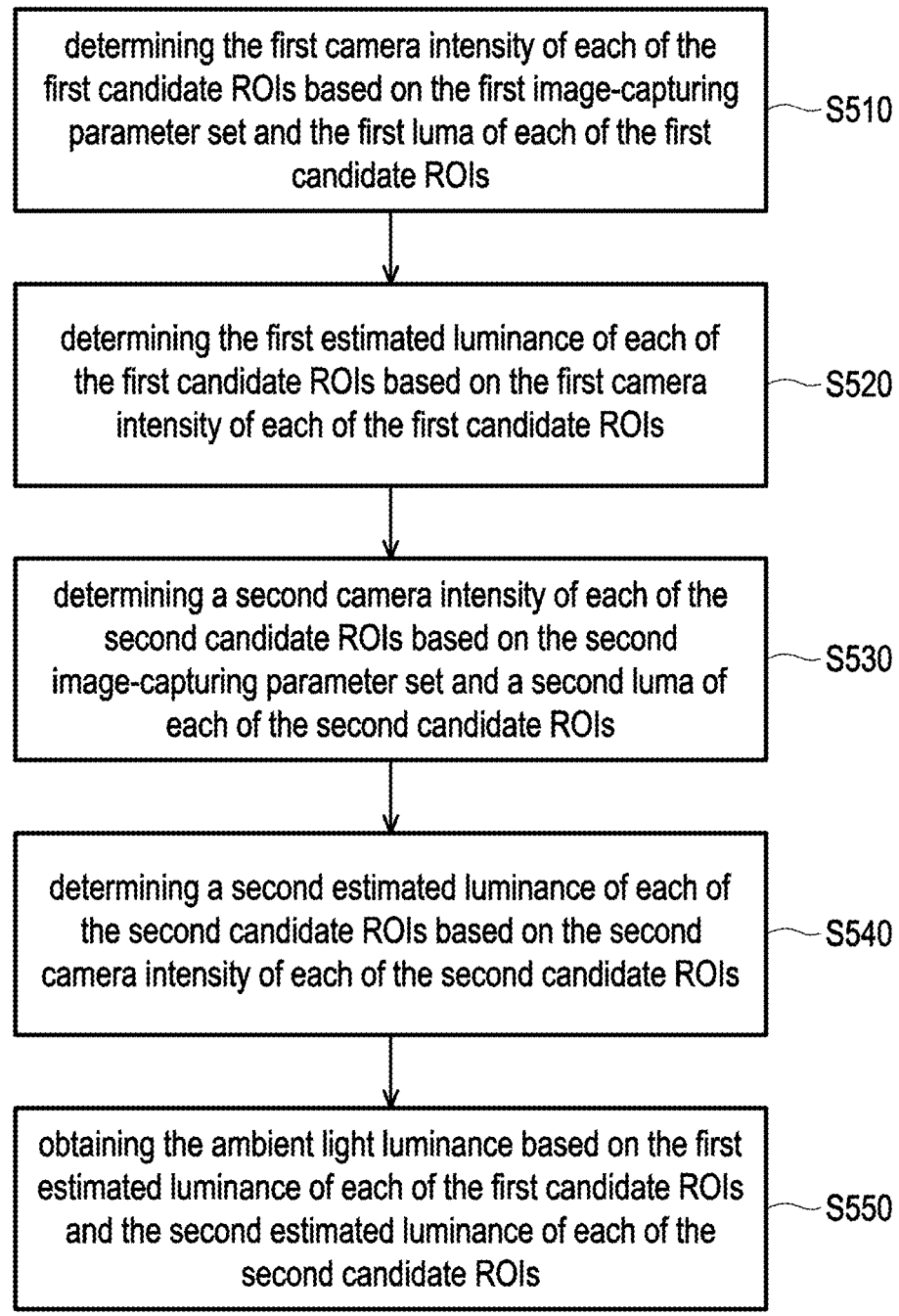
FIG. 5 shows a flow chart of determining the ambient light luminance based on the first candidate ROI(s) and the second candidate ROI(s) according to an embodiment of the disclosure.

See FIG. 5, which shows a flow chart of determining the ambient light luminance based on the first candidate ROI(s) and the second candidate ROI(s) according to an embodiment of the disclosure.

In step S510, the processor 104 determines the first camera intensity of each of the first candidate ROIs based on the first image-capturing parameter set and the first luma of each of the first candidate ROIs. In one embodiment, the processor 104 can determine the first camera intensity of the respective first candidate ROI by dividing the first luma of the respective first candidate ROI with a multiplication of the first exposure time and the first gain. For example, if the first luma of one first candidate ROI is L1 (i.e., the average of grayscale values in this first candidate ROI), the first exposure time is Exp1 and the first gain G1, the first camera intensity of this first candidate ROI can be characterized by L1/(Exp1·G1), but the disclosure is not limited thereto.

In step S520, the processor 104 determines the first estimated luminance of each of the first candidate ROIs based on the first camera intensity of each of the first candidate ROIs.

In one embodiment, the processor 104 can determine the first estimated luminance of the respective first candidate ROI by searching for a result corresponding to the first camera intensity of the respective first candidate ROI in the first look-up table as the first estimated luminance of the respective first candidate ROI.

In one embodiment, the first look-up table can be established in advance based on the curve 301 in FIG. 3A. In this case, once the first camera intensity of one first candidate ROI is obtained, the processor 104 can use the corresponding ambient light luminance in FIG. 3A as the corresponding first estimated luminance. For example, if the first camera intensity of one first candidate ROI is 2000, the corresponding first estimated luminance would be about 6000 according to FIG. 3A.

In step S530, the processor 104 determines a second camera intensity of each of the second candidate ROIs based on the second image-capturing parameter set and a second luma of each of the second candidate ROIs. In one embodiment, the processor 104 can determine the second camera intensity of the respective second candidate ROI by dividing the second luma of the respective second candidate ROI with a multiplication of the second exposure time (i.e., Exp(min)) and the second gain (Gain(min)). For example, if the second luma of one second candidate ROI is L2 (i.e., the average of grayscale values in this second candidate ROI), the second camera intensity of this second candidate ROI can be characterized by L1/(Exp(min)·Gain(min)), but the disclosure is not limited thereto.

In step S540, the processor 104 determines a second estimated luminance of each of the second candidate ROIs based on the second camera intensity of each of the second candidate ROIs.

In one embodiment, the processor 104 can determine the second estimated luminance of the respective second candidate ROI by searching for a result corresponding to the second camera intensity of the respective second candidate ROI in a second look-up table as the second estimated luminance of the respective second candidate ROI.

In one embodiment, the second look-up table can be established in advance based on the curve 302 in FIG. 3B. In this case, once the second camera intensity of one second candidate ROI is obtained, the processor 104 can use the corresponding ambient light luminance in FIG. 3B as the corresponding second estimated luminance. For example, if the second camera intensity of one second candidate ROI is 4000, the corresponding second estimated luminance would be about 15100 according to FIG. 3B. For another example, if the second camera intensity of one second candidate ROI is 10000, the corresponding second estimated luminance would be about 40000 according to FIG. 3B.

In step S550, the processor 104 obtains the ambient light luminance based on the first estimated luminance of each of the first candidate ROIs and the second estimated luminance of each of the second candidate ROIs.

In one embodiment, the ambient light luminance in step S230 can be the first estimated luminance of one or more of the first candidate ROI(s) and/or the second estimated luminance of one or more of the second candidate ROI(s).

In one embodiment, the ambient light luminance in step S230 can be the estimated ambient light luminance corresponding to the first frame F1 and/or the second frame F2. In this case, the processor 104 can obtain the ambient light luminance by taking an average of the first estimated luminance of each of the first candidate ROIs and the second estimated luminance of each of the second candidate ROIs.

As can be seen from the descriptions in the above, the embodiments of the disclosure can determine the ambient light luminance by further using the information provided by the bright frame and the dark frame for performing the tracking function (e.g., the inside-out tracking). Therefore, there is no need to additionally dispose a light detector on the host 100 (e.g., the HMD), such that the spatial efficiency can be improved while reducing the cost.

Figure 6:
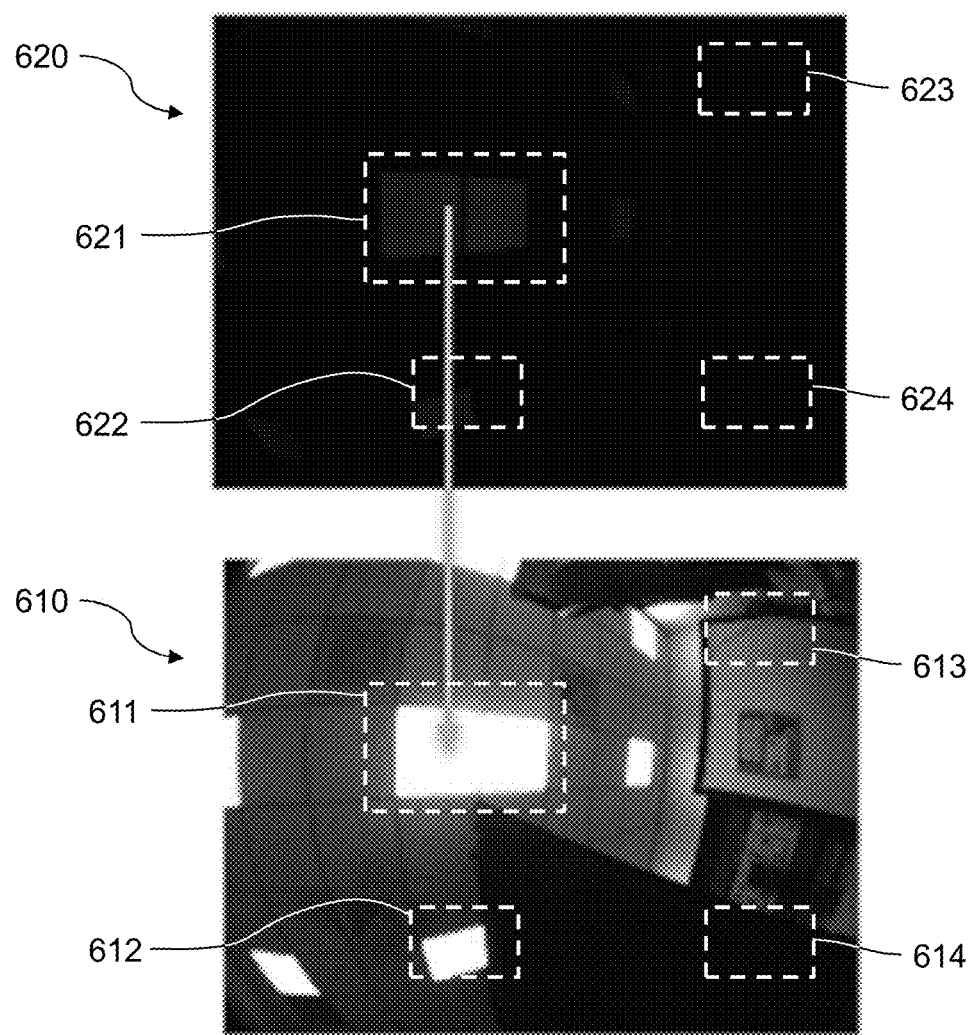
FIG. 6 shows an application scenario of determining the ambient light luminance according to a first embodiment of the disclosure.

For better understanding the concept of the disclosure, FIG. 6 would be used as an example for discussion.

See FIG. 6, which shows an application scenario of determining the ambient light luminance according to a first embodiment of the disclosure. In FIG. 6, the processor 104 obtains one of the bright frames as the first frame 610 and obtains one of the dark frames as the second frame 620, wherein the first frame 610 can be the image previous to the second frame 620, but the disclosure is not limited thereto. In the first embodiment, it is assumed that each of the first ROIs and the second ROIs includes multiple pixels.

In FIG. 6, assuming that the processor 104 determines first ROIs 611-614 in the first frame 610 and determines second ROIs 621-624 in the second frame 620, wherein the first ROIs 611-614 are one-to-one corresponding to the second ROIs 621-624.

In one embodiment, the processor 104 can determine the first estimated luminance of each of the first ROIs 611-614 and determine whether there is an overexposure issue in each of the first ROIs 611-614. In FIG. 6, assuming that the first ROIs 611, 612 correspond to the objects with high light intensities (e.g., some light sources), the first estimated luminance of each of the first ROIs 611, 612 would be higher than the luminance threshold, or the first luma of each of the first ROIs 611, 612 would reach the luma upper limit. In this case, the processor 104 can determine the first ROIs 611, 612 as the specific ROIs satisfying the predetermined condition.

In addition, assuming that the first ROIs 613, 614 do not correspond to the objects with high light intensities (e.g., some light sources), the first estimated luminance of each of the first ROIs 613, 614 would not be higher than the luminance threshold, and the first luma of each of the first ROIs 611, 612 would not reach the luma upper limit. In this case, the processor 104 can determine the first ROIs 613, 614 as the first candidate ROIs.

Since the first ROIs 611, 612 are considered as the specific ROIs satisfying the predetermined condition, the processor 104 can accordingly find the part of the second ROIs 621-624 corresponding to the first ROIs 611, 612 (i.e., the specific ROIs) as the second candidate ROIs. In the scenario of FIG. 6, the processor 104 can determine the second ROIs 621, 622 as the second candidate ROIs corresponding to the first ROIs 611, 612 (i.e., the specific ROIs).

Afterwards, the processor 104 can determine the ambient light luminance based on the first candidate ROIs (i.e., the first ROIs 613, 614) and the second candidate ROIs (i.e., the second ROIs 621, 622). In one embodiment, the processor 104 can obtain the ambient light luminance by taking an average of the first estimated luminance of each of the first candidate ROIs (i.e., the first ROIs 613, 614) and the second estimated luminance of each of the second candidate ROIs (i.e., the second ROIs 621, 622).

In FIG. 6, the size/position/shape of each of the first ROIs 611-614 and the second ROIs 621-624 are merely examples. In various embodiments, the size/position/shape of each of the first ROIs and the second ROIs can be arbitrarily determined based on the requirements of the designer.

Figure 7:
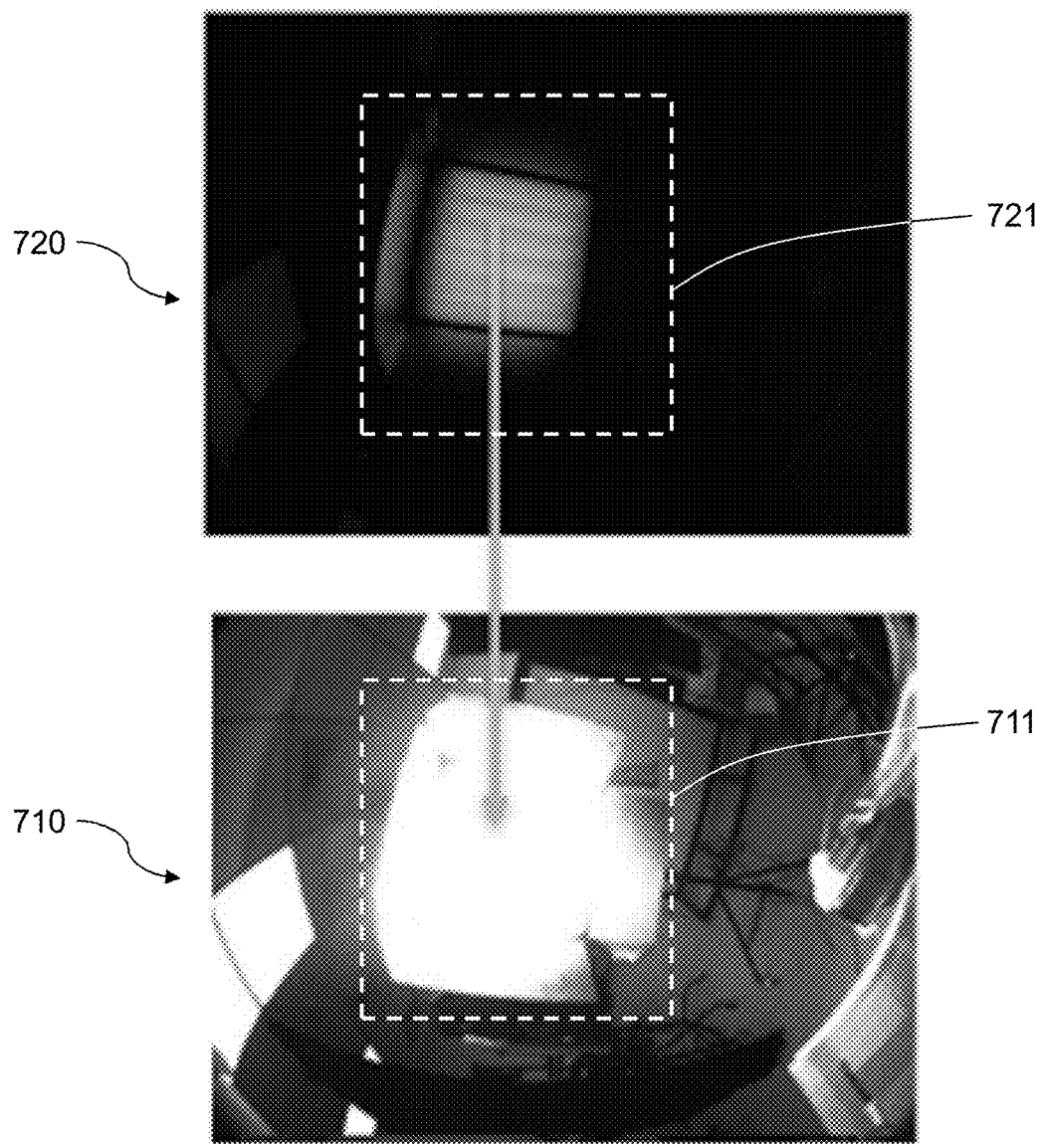
FIG. 7 shows an application scenario of determining the ambient light luminance according to a second embodiment of the disclosure.

See FIG. 7, which shows an application scenario of determining the ambient light luminance according to a second embodiment of the disclosure. In FIG. 7, the processor 104 obtains one of the bright frames as the first frame 710 and obtains one of the dark frames as the second frame 720, wherein the first frame 710 can be the image previous to the second frame 720, but the disclosure is not limited thereto.

In the second embodiment, it is assumed that each of the first ROIs and the second ROIs includes one pixel. That is, each pixel in the first frame 710 is one of the first ROIs in the first frame 710, and each pixel in the second frame 720 is one of the second ROIs in the second frame 720.

In FIG. 7, it is assumed that the pixels (i.e., the first ROIs) in a region 711 are determined to have the overexposure issue based on teachings in the above. In this case, the processor 104 can determine the pixels outside of the region 711 as the first candidate ROIs and determine the pixels within the region 711 as the specific ROIs satisfying the predetermined condition.

Afterwards, the processor 104 can determine the pixels (i.e., the second ROIs) in a region 721 of the second frame 720 as the second candidate ROIs corresponding to the specific ROIs. Next, the processor 104 can determine the ambient light luminance based on the first candidate ROIs (i.e., the pixels outside of the region 711) and the second candidate ROIs (i.e., the pixels within the region 721). In one embodiment, the processor 104 can obtain the ambient light luminance by taking an average of the first estimated luminance of each of the first candidate ROIs and the second estimated luminance of each of the second candidate ROIs.

In one embodiment, if the processor 104 determines that there is no specific ROI satisfying the predetermined condition in the first frame F1, it represents that there is no overexposure issue for all of the first ROIs (i.e., all of the first ROIs can be regarded as the first candidate ROIs). In this case, the processor 104 can determine the ambient light luminance based on the first ROIs. In one embodiment, the processor 104 can obtain the ambient light luminance by taking an average of the first estimated luminance of each of the first ROIs, but the disclosure is not limited thereto.

In the embodiments of the disclosure, after obtaining the ambient light luminance, the processor 104 can accordingly perform a brightness control mechanism and several shutter control mechanisms. Detailed discussion will be provided in the following.

Figure 8:
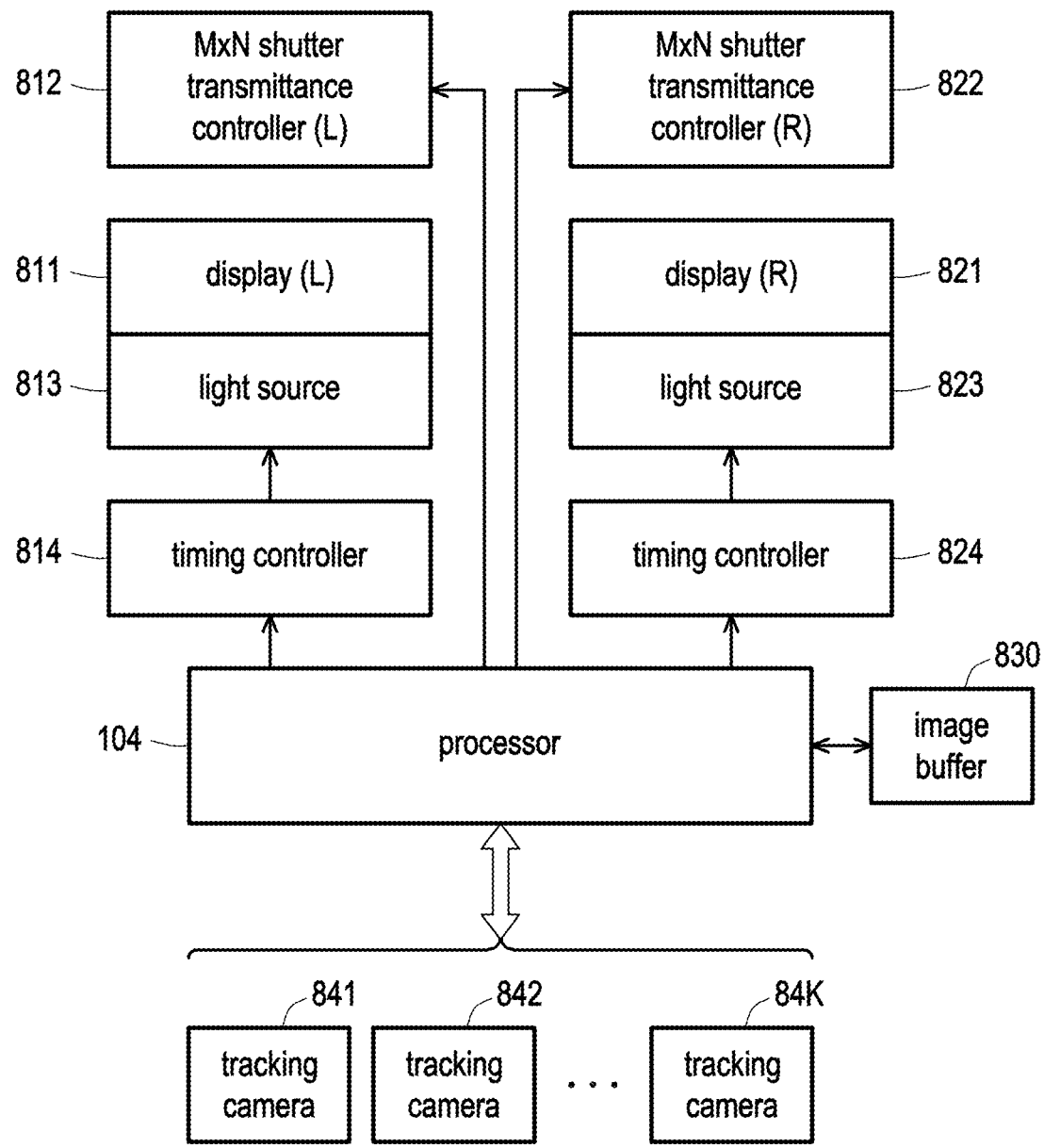
FIG. 8 shows a schematic diagram of the host according to an embodiment of the disclosure.

See FIG. 8, which shows a schematic diagram of the host according to an embodiment of the disclosure. In FIG. 8, the host 800 includes a processor 104, displays 811, 821, M×N shutter transmittance controllers 812, 822, light sources 813, 823, timing controllers 814, 824, an image buffer 830, and tracking cameras 841-84K.

In one embodiment, the display 811 can be the left display of the host 800 (e.g., the HMD), and the light source 813 can be the light source for the left display. In one embodiment, the processor 104 can control the light source 813 via sending control signals to the timing controller 814.

In one embodiment, the display 811 can correspond to a first shutter structure having M×N shutter regions (wherein M, N are integers). In one embodiment, the first shutter structure can be disposed between the left eye of the user and the display 811, and the processor 104 can control the transmittance of each shutter region via sending control signals to the M×N shutter transmittance controller 812. In one embodiment, the sizes of the first shutter structure and the display 811 are the same. In one embodiment, if one of the shutter regions of the first shutter structure is adjusted to have a lower transmittance, the light from the corresponding part on the display 811 would be less perceivable to the user, i.e., the corresponding part on the display 811 would be (slightly) dimmed to the user.

In one embodiment, the display 821 can be the right display of the host 800 (e.g., the HMD), and the light source 823 can be the light source for the right display. In one embodiment, the processor 104 can control the light source 823 via sending control signals to the timing controller 824.

In one embodiment, the display 821 can correspond to a second shutter structure having M×N shutter regions (wherein M, N are integers). In one embodiment, the second shutter structure can be disposed between the right eye of the user and the display 821, and the processor 104 can control the transmittance of each shutter region via sending control signals to the M×N shutter transmittance controller 822. In one embodiment, the sizes of the second shutter structure and the display 821 are the same. In one embodiment, if one of the shutter regions of the second shutter structure is adjusted to have a lower transmittance, the light from the corresponding part on the display 821 would be less perceivable to the user, i.e., the corresponding part on the display 821 would be (slightly) dimmed to the user.

In one embodiment, the image buffer 830 (which can be implemented as a part of the storage circuit 102) can be used to store the images used for determining the ambient light luminance, such as the first frame F1 and the second frame F2, but the disclosure is not limited thereto.

In one embodiment, the processor 104 can be coupled to the tracking cameras 841-84K, and each of the tracking cameras can be used to captured the corresponding bright frames and dark frames for performing the tracking function and determining the ambient light luminance, but the disclosure is not limited thereto.

In a third embodiment, after obtaining the ambient light luminance, the processor 104 can determine a target brightness of the displays 811, 821 based on the ambient light luminance and set a brightness of the displays 811, 821 as the target brightness. In one embodiment, the procedure of determining the target brightness can be referred to the conventional art of determining the brightness of a display based on the environment light, and the details thereof would not be further provided herein.

In other embodiments where the considered host 800 only includes one display, the processor 104 can also determine the target brightness based on the ambient light luminance and accordingly set the brightness of the display.

In a fourth embodiment where each of the first ROIs and the second ROIs includes one pixel, the processor 104 can obtain the shutter regions corresponding to the display (e.g., the display 811 and/or 821) and obtain a regional brightness of each of the shutter regions based on the first candidate ROI(s) and the second candidate ROI(s).

In one embodiment, the processor 104 can determine the first estimated luminance of each of the first candidate ROIs and the second estimated luminance of each of the second candidate ROIs based on the teachings in the above embodiments. Next, the processor 104 can determine the regional brightness of the respective shutter region by taking an average of the first estimated luminance of each of the first candidate ROIs corresponding to the respective shutter region and the second estimated luminance of each of the second candidate ROIs corresponding to the respective shutter region.

Taking the scenario of FIG. 7 as an example, assuming that the content of the first frame 710 is a part of a bright frame and the content of the second frame 720 is a part of a dark frame, and the size and position of the considered shutter region is assumed to be identical to the part of the bright/dark frame. That is, the considered shutter region correspond to some of the first candidate ROIs and the second candidate ROIs. In this case, the processor 104 can determine the regional brightness of this shutter region by taking an average of the of the first estimated luminance of each of the first candidate ROIs (i.e., the pixels outside of the region 711) corresponding to this shutter region and the second estimated luminance of each of the second candidate ROIs (i.e., the pixels within the region 721) corresponding to this shutter region.

Afterwards, the processor 104 determines a first target transmittance of each of the shutter regions based on a first contrast value (referred to as CR1) and the regional brightness of each of the shutter regions. In one embodiment, the first target transmittance of one shutter region can be characterized by "$W255/((CR1-1) \cdot ALIT)$", wherein W255 is the brightness of the display (or the brightness corresponding to the highest grayscale value), and ALIT is the regional brightness of this shutter region. In one embodiment, the first target transmittance of each shutter region is limited between an upper transmittance limit and a lower transmittance limit.

After determining the first target transmittance of each of the shutter regions, the processor 104 can set a first transmittance of each of the shutter regions as the corresponding first target transmittance.

As can be observed in the formula of "$W255/((CR1-1) \cdot ALIT)$", the first target transmittance is negatively related to the corresponding regional brightness. That is, the higher the regional brightness of a shutter region, the corresponding first target transmittance would be lower, and vice versa.

Accordingly, for some image regions corresponding to objects with high light intensities (e.g., light sources), the transmittances of the corresponding shutter regions would be determined to have a lower value, such that the light from these objects will not affect the visual experience of the user. For example, when the processor 104 displays some visual content (e.g., AR objects) at the positions corresponding to these objects, the processor 104 can adjust the shutter regions corresponding to these objects to have lower transmittances, such that the user can see the visual content more clearly, but the disclosure is not limited thereto.

In a fifth embodiment, the processor 104 can obtain a specific shutter region corresponding to a part of the display (e.g., the display 811 and/or 821). In one embodiment, the specific shutter region can correspond to a gazed region on the display. That is, the processor 104 can determine the shutter region currently gazed by the user as the specific shutter region, but the disclosure is not limited thereto.

Afterwards, the processor 104 obtains the regional brightness of the specific shutter region based on the first candidate ROI(s) and the second candidate ROI(s). The details of obtaining the regional brightness of the specific shutter region can be referred to the teachings of obtaining the regional brightness of the above shutter regions, which would not be repeated herein.

Next, the processor 104 determines a specific target transmittance of the specific shutter region based on a specific contrast value (referred to as CR') and the regional brightness of the specific shutter region. In the fifth embodiment, the specific contrast value can be the contrast value specifically for some part of the display, such as the contrast value specifically for the gazed region of the user on the display, which may be higher than the first contrast value, but the disclosure is not limited thereto.

In one embodiment, the specific target transmittance of the specific shutter region can be characterized by "$W255/((CR'-1) \cdot ALIT)$", wherein W255 is the brightness of the display (or the brightness corresponding to the highest grayscale value), and ALIT is the regional brightness of the specific shutter region. In one embodiment, the specific target transmittance of the specific shutter region is limited between an upper transmittance limit and a lower transmittance limit.

In the fifth embodiment, the processor 104 sets a second transmittance of the specific shutter region as the specific target transmittance.

Accordingly, the processor 104 can specifically adjust the specific target transmittance of the specific shutter region, such that the visual experience of the user can be improved. For example, the visual content gazed by the user can be more clear for the user to see, but the disclosure is not limited thereto.

The disclosure further provides a computer readable storage medium for executing the method for determining the ambient light luminance. The computer readable storage medium is composed of a plurality of program instructions (for example, a setting program instruction and a deployment program instruction) embodied therein. These program instructions can be loaded into the hosts 100, 800 and executed by the same to execute the method for determining an ambient light luminance and the functions of the hosts 100, 800 described above.

In summary, the embodiments of the disclosure can determine the ambient light luminance by further using the information provided by the bright frame and the dark frame for performing the tracking function. Therefore, there is no need to additionally dispose a light detector on the host (e.g., the HMD), such that the spatial efficiency can be improved while reducing the cost.

In addition, the embodiments of the disclosure further provide a brightness control mechanism and several shutter control mechanisms, which can improve the visual experience of the user.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for determining an ambient light luminance, adapted to a host, comprising:
    obtaining a first frame and a second frame, wherein the first frame comprises a plurality of first regions of interest (ROI), the second frame comprises a plurality of second ROIs, and the first ROIs respectively correspond to the second ROIs;
    in response to determining that the first ROIs comprise at least one specific ROI satisfying a predetermined condition and at least one first candidate ROI, obtaining at least one second candidate ROI among the second ROIs, wherein the at least one second candidate ROI respectively correspond to the at least one specific ROI; and
    determining the ambient light luminance based on the at least one first candidate ROI and the at least one second candidate ROI.

2. The method according to claim 1, further comprising:
    obtaining a plurality of first specific frames and a plurality of second specific frames, wherein the first specific frames correspond to a first image-capturing parameter set, and the second specific frames correspond to a second image-capturing parameter set;
    retrieving one of the first specific frames as the first frame; and
    retrieving one of the second specific frames as the second frame.

3. The method according to claim 2, wherein the first specific frames are interleaved with the second specific frames.

4. The method according to claim 2, wherein a time difference between the first frame and the second frame is less than a predetermined time threshold.

5. The method according to claim 2, wherein a time difference between the first frame and the second frame is equal to a reciprocal of a frame rate.

6. The method according to claim 2, wherein the first image-capturing parameter set comprises at least one automatically-determined image-capturing parameter, and the second image-capturing parameter comprises at least one fixed image-capturing parameter.

7. The method according to claim 1, wherein each of the first ROIs and the second ROIs comprises one or more pixel.

8. The method according to claim 1, wherein the first frame is captured based on a first image-capturing parameter set, and the method further comprises:
    determining a first camera intensity of each of the first ROIs based on the first image-capturing parameter set and a first luma of each of the first ROIs;
    determining a first estimated luminance of each of the first ROIs based on the first camera intensity of each of the first ROIs;
    in response to determining that the first estimated luminance of one of the first ROIs is higher than a luminance threshold or the first luma of the one of the first ROIs reaches the luma upper limit, determining that the one of the first ROIs belongs to the at least one specific ROI satisfying the predetermined condition; and
    in response to determining that the first estimated luminance of one of the first ROIs is not higher than the luminance threshold and the first luma of the one of the first ROIs does not reach the luma upper limit, determining that the one of the first ROIs belongs to the at least one first candidate ROI.

9. The method according to claim 8, wherein the first image-capturing parameter comprises a first exposure time and a first gain, and the first camera intensity of the respective first ROI is determined by dividing the first luma of the respective first ROI with a multiplication of the first exposure time and the first gain.

10. The method according to claim 8, wherein the first estimated luminance of the respective first ROI is determined by searching for a result corresponding to the first camera intensity of the respective first ROI in a first look-up table as the first estimated luminance of the respective first ROI.

11. The method according to claim 1, wherein the first frame and the second frame are used for performing a tracking function.

12. The method according to claim 1, wherein the first frame is captured based on a first image-capturing parameter set, the second frame is captured based on a second image-capturing parameter set, and the step of determining the ambient light luminance based on the at least one first candidate ROI and the at least one second candidate ROI comprises:
    determining a first camera intensity of each of the first candidate ROIs based on the first image-capturing parameter set and a first luma of each of the first candidate ROIs;

determining a first estimated luminance of each of the first candidate ROIs based on the first camera intensity of each of the first candidate ROIs;

determining a second camera intensity of each of the second candidate ROIs based on the second image-capturing parameter set and a second luma of each of the second candidate ROIs;

determining a second estimated luminance of each of the second candidate ROIs based on the second camera intensity of each of the second candidate ROIs; and obtaining the ambient light luminance based on the first estimated luminance of each of the first candidate ROIs and the second estimated luminance of each of the second candidate ROIs.

13. The method according to claim 12, wherein the ambient light luminance is an average of the first estimated luminance of each of the first candidate ROIs and the second estimated luminance of each of the second candidate ROIs.

14. The method according to claim 1, further comprising:
determining a target brightness of a display based on the ambient light luminance; and
setting a brightness of the display as the target brightness.

15. The method according to claim 1, further comprising:
obtaining a plurality of shutter regions corresponding to a display;
obtaining a regional brightness of each of the shutter regions based on the at least one first candidate ROI and the at least one second candidate ROI;
determining a first target transmittance of each of the shutter regions based on a first contrast value and the regional brightness of each of the shutter regions; and
setting a first transmittance of each of the shutter regions as the corresponding first target transmittance.

16. The method according to claim 15, wherein each of the at least one first candidate ROI and the at least one second candidate ROI comprises one pixel, and the step of obtaining the regional brightness of each of the shutter regions based on the at least one first candidate ROI and the at least one second candidate ROI comprises:
determining a first estimated luminance of each of the first candidate ROIs and a second estimated luminance of each of the second candidate ROIs; and
determining the regional brightness of the respective shutter region by taking an average of the first estimated luminance of each of the first candidate ROIs corresponding to the respective shutter region and the second estimated luminance of each of the second candidate ROIs corresponding to the respective shutter region.

17. The method according to claim 1, further comprising:
obtaining a specific shutter region corresponding to a part of a display;

obtaining a regional brightness of the specific shutter region based on the at least one first candidate ROI and the at least one second candidate ROI;

determining a specific target transmittance of the specific shutter region based on a specific contrast value and the regional brightness of the specific shutter region; and setting a second transmittance of the specific shutter region as the specific target transmittance.

18. The method according to claim 17, wherein the specific shutter region corresponds to a gazed region on the display.

19. A host, comprising:
a non-transitory storage circuit, storing a program code;
a processor, coupled to the non-transitory storage circuit and accessing the program code to perform:
obtaining a first frame and a second frame, wherein the first frame comprises a plurality of first regions of interest (ROI), the second frame comprises a plurality of second ROIs, and the first ROIs respectively correspond to the second ROIs;
in response to determining that the first ROIs comprise at least one specific ROI satisfying a predetermined condition and at least one first candidate ROI, obtaining at least one second candidate ROI among the second ROIs, wherein the at least one second candidate ROI respectively correspond to the at least one specific ROI; and
determining the ambient light luminance based on the at least one first candidate ROI and the at least one second candidate ROI.

20. A non-transitory computer readable storage medium, the computer readable storage medium recording an executable computer program, the executable computer program being loaded by a host to perform steps of:
obtaining a first frame and a second frame, wherein the first frame comprises a plurality of first regions of interest (ROI), the second frame comprises a plurality of second ROIs, and the first ROIs respectively correspond to the second ROIs;
in response to determining that the first ROIs comprise at least one specific ROI satisfying a predetermined condition and at least one first candidate ROI, obtaining at least one second candidate ROI among the second ROIs, wherein the at least one second candidate ROI respectively correspond to the at least one specific ROI; and
determining the ambient light luminance based on the at least one first candidate ROI and the at least one second candidate ROI.

* * * * *